(12) United States Patent
Sharangpani et al.

(10) Patent No.: US 7,085,918 B2
(45) Date of Patent: Aug. 1, 2006

(54) METHODS AND APPARATUSES FOR EVALUATION OF REGULAR EXPRESSIONS OF ARBITRARY SIZE

(75) Inventors: Harshvardan Sharangpani, Santa Clara, CA (US); Manoj Khare, Saratoga, CA (US); Kent Fielden, Sunnyvale, CA (US); Rajesh Patil, Santa Clara, CA (US); Judge Kennedy Arora, Los Gatos, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 10/755,048

(22) Filed: Jan. 8, 2004

(65) Prior Publication Data

US 2005/0012521 A1 Jan. 20, 2005

Related U.S. Application Data

(60) Provisional application No. 60/438,847, filed on Jan. 9, 2003.

(51) Int. Cl.
*G06F 15/00* (2006.01)
*G06F 17/28* (2006.01)

(52) U.S. Cl. .............................. 712/217; 700/5; 700/1; 704/4; 704/232; 326/46

(58) Field of Classification Search ................. 326/46; 704/4, 255, 232, 231; 706/1, 9, 17, 20, 52
See application file for complete search history.

(56) References Cited

U.S. PATENT DOCUMENTS

| | | | |
|---|---|---|---|
| 4,965,472 A | 10/1990 | Anderson | |
| 5,163,016 A | 11/1992 | Har'El et al. | |
| 5,905,902 A | 5/1999 | O'Connor | |
| 5,949,251 A | 9/1999 | Chambers | |
| 6,212,625 B1 | 4/2001 | Russell | |
| 6,253,112 B1 | 6/2001 | Flora-Holmquist et al. | |
| 6,266,634 B1 * | 7/2001 | Buchsbaum et al. | ........ 704/232 |
| 6,327,508 B1 | 12/2001 | Mergard | |

(Continued)

FOREIGN PATENT DOCUMENTS

WO WO 94/19757 9/1994

(Continued)

OTHER PUBLICATIONS

International Search Report for International Application No. PCT/US2004/000435 dated Jul. 16, 2004.

(Continued)

*Primary Examiner*—Vibol Tan
(74) *Attorney, Agent, or Firm*—Blakely, Sokoloff, Taylor & Zafman LLP

(57) ABSTRACT

Embodiments of the invention provide a programmable FSA building block, having a number of programmable registers and associated logic implemented therein, that provide the capability of contextually evaluating complex REs of arbitrary size against multiple data streams. Embodiments of the invention provide fully programmable hardware in which all of the states of an RE are instantiated and all of the states are fully connected. For one embodiment, the building blocks have a fixed number of states to facilitate implementation on a chip. For such an embodiment, an RE having an excessive number of states is implemented on two or more FSA building blocks and the FSA building blocks are then stitched together to effect evaluation of the RE. For one embodiment, two or more REs having a number of states less than the fixed number of states of a building block may be implemented with a single building block.

12 Claims, 11 Drawing Sheets

U.S. PATENT DOCUMENTS

| | | | |
|---|---|---|---|
| 6,380,924 B1* | 4/2002 | Yee et al. .................... | 345/156 |
| 2003/0120480 A1* | 6/2003 | Mohri et al. .................... | 704/4 |
| 2004/0059443 A1 | 3/2004 | Sharangpani | |

FOREIGN PATENT DOCUMENTS

| | | |
|---|---|---|
| WO | WO 2004/021181 A2 | 3/2004 |

OTHER PUBLICATIONS

International Preliminary Report on Patentability for International Application No. PCT/US2004/000435 issued Jul. 15, 2005 from the International Bureau of WIPO, Switzerland. Mailed with cover page titled Important Notice Jul. 28, 2005. 10 pages total.

Alfred V. Aho, et al., "Compilers: Principles, Techniques, and Tools," Addison-Wesley Publishers, pp. i-x, and 83-278 (Mar. 1988).

Danield Jurafsky and James H. Martin, "Speech and Language Processing: An introduction to Natural Language Processing, Computational Linguistics, and Speech Recognition," Prentice Hall Inc., pp. i-xxvi and 1-90 (2000), No month.

* cited by examiner

| PROPERTIES OF DFA AND NFA TECHNIQUES USED ON CONVENTIONAL MICROPROCESSORS | STORAGE: BOUND ON # OF STATES (FOR R CHARACTER REGULAR EXPRESSION) | EVALUATION TIME (FOR N BYTES OF INPUT) [ORDER OF] |
|---|---|---|
| DETERMINISTIC FINITE STATE AUTOMATA OR DFA RUNNING ON A GP CPU | $2^R$ (NEEDS VERY LARGE MEMORY) | N MEMORY ACCESS CYCLES |
| NON-DETERMINISTIC FINITE STATE AUTOMATA OR NFA RUNNING ON A GP CPU | R | R * N CPU CACHE+BRANCH CYCLES |

FIG. 1A
(PRIOR ART)

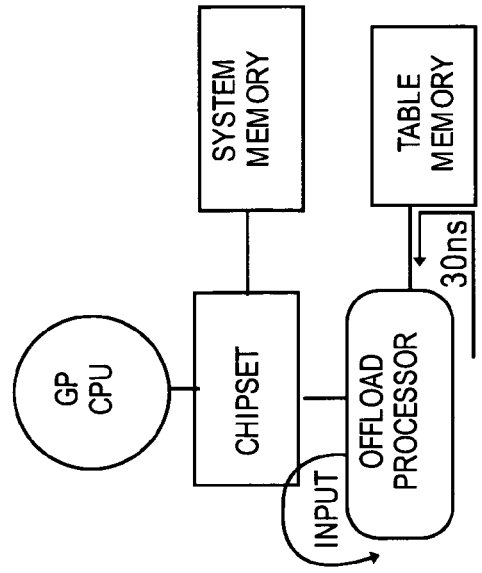
COPROCESSOR CLOSER TO TABLE IN SRAM
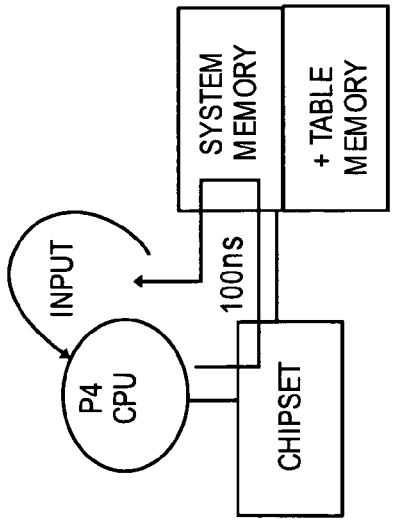
CPU WALKING DFA TABLE IN DRAM
PERFORMANCE ON EVALUATING REGULAR EXPRESSIONS ON EVERY BYTE OF INPUT STREAM
1000s OF REs @ 100 Mbps
GIGABYTES OF MEMORY
100s OF REs @ 280 Mbps
100s OF MBs OF SRAM
FIG. 1B
(PRIOR ART)

METHODS AND APPARATUSES FOR EVALUATION OF REGULAR EXPRESSIONS OF ARBITRARY SIZE

CLAIM OF PRIORITY

This application is a non-provisional application of U.S. Provisional Patent Application No. 60/438,847, filed Jan. 9, 2003 and is related U.S. patent application Ser. No. 10/650,364, filed on Aug. 28, 2003, both of which are hereby incorporated by reference.

FIELD

Embodiments of the invention relate, generally, to the field of information processing, and, more specifically, to the field of content analytics and processing.

BACKGROUND

Continuing trends in computing and communications lead to the emergence of environments that abound in content analytics and processing. Exemplary fields that typically require such high performance content analytics and processing include content-aware networking, content-based security systems, surveillance, distributed computing, wireless communication, information storage and retrieval systems, and many others.

The computer and communications environments used in such fields will require high levels of content analysis and processing. Such environments will need efficient and programmable solutions for stateful and contextual inspection, searching, lexical analysis, parsing, characterization, interpretation, filtering, and transformation of content in messages, documents, or packets. Central to these content processing functions is the ability to efficiently evaluate state machines against an input data stream.

State machines, which are central to the theory of computation, are formal models that consist of states, transition amongst states, and an input representation, in their simplest formulation. In the 1950s, the regular expression (RE) was developed by Kleene as a formal notation to describe and characterize sets of strings. The finite state automation was developed as a state machine model that was found to be equivalent to the RE. Non-deterministic automata (NFA) were developed and shown to be equivalent to deterministic automata. Subsequent work by Thompson and others led to a body of construction algorithms for constructing finite state automata to evaluate an RE. A large number of references are available for descriptions of Regular Expressions and Finite State Automata. For a reference text on the material, see "Speech and Language Processing" (by Daniel Jurafsky and James H. Martin, Prentice-Hall Inc, 2000). The RE has evolved into a powerful tool for pattern matching and recognition, and the finite state automation has become the standard technique to implement a machine to evaluate it.

State machine and finite state automata processing is typically performed in one of three ways. First, such processing has been performed by implementing a fixed and chosen state machine that is known a priori. This may be effected using a fixed application specific integrated circuit (ASIC) solution. This approach can increase performance, but lacks programmability. Moreover, the expense of such implementation is often prohibitive.

Second, state machines may be realized in a programmable manner using Field Programmable Gate Arrays (FPGA). The FPGA architecture provides generalized programmable logic that can be configured for a broad range of applications. However, this approach can only accommodate a small number of state machines on a chip and the rate at which the evaluation can progress is limited. Therefore, this approach is inadequate for the broad range of emerging applications.

Third, a variety of state machines may be implemented using conventional general-purpose microprocessors. Because microprocessors are fully programmable, this approach is able to address evolving requirements, but microprocessors have several limitations in regard to evaluating state machines.

FIG. 1(a) illustrates the limitations of the microprocessor-based approach when implementing a Finite State Automata (FSA). Two implementation options exist, the Deterministic Finite State Automata (DFA) approach, and the Non-deterministic Finite State Automata (NFA) approach. The two approaches are compared on their ability to implement an R-character RE and evaluate it against N bytes of an input data stream. In either approach, the RE is mapped into a state machine or a finite state automata with a certain number of states. The amount of storage required to accommodate these states is one metric used to evaluate a microprocessor-based solution. A second metric is the total time needed to evaluate the N-byte input data stream.

For the DFA approach, the bound on the storage required for an R-character RE is $2^R$. Hence, a very large amount of storage may be required to accommodate the states. A DFA is typically implemented by building a state transition table in memory, and having the microprocessor sequence through the table as it progressively evaluates the input data. The large size of the state transition table renders the cache subsystem in typical commercial microprocessors ineffective and requires that the microprocessor access external memory to lookup the table on every fresh byte of the input data in order to determine the next state. Thus, the rate at which the state machine can evaluate input data is limited by the memory access loop. This is illustrated in FIG. 1(b). For N bytes of input stream, the time taken to evaluate the state machine is proportional to N accesses of memory. Typical systems have memory access latencies of approximately 100 nanoseconds (ns). This limits the data rate that can be evaluated against the state machine to approximately 100 Mbps.

To evaluate multiple REs in parallel, one option is to implement the REs in distinct tables in memory, with the microprocessor sequentially evaluating them one after the other. For K parallel REs, the evaluation time would be approximately K*N*100 ns, while the bound on storage would grow to $K*2^R$. Another alternative is to compile all of the REs into a single DFA and have the microprocessor sequence through the table in a single pass. For K parallel Res, the bound on storage would grow to $2^{(K*R)}$, while the evaluation time would remain N*100 ns. The storage needed for such an approach could be prohibitive. To implement a few thousand REs, the storage needed could exceed the physical limits of memory for typical commercial systems.

For the NFA approach, the bound on the storage required for an R-character RE is proportional to R. Hence, storage is not a concern. However, in an NFA, multiple nodes could make independent state transitions simultaneously, each based on independent evaluation criteria. Given that the microprocessor is a scalar engine, which can execute a single thread of control in sequential order, the multiple state transitions of an NFA require that the microprocessor iterate through the evaluation of each state sequentially. Hence, for every input byte of data, the evaluation has to be repeated R times. Given that the storage requirements for the scheme are modest, all the processing could be localized to using on-chip resources, thus remaining free of the memory bottleneck. Each state transition computation is accomplished with on-chip evaluation whose performance is limited by the latency of access of data from the cache and the latency of branching. Since typical microprocessors are highly pipelined, the performance penalty incurred due to branching is significant. For example, assuming a 16-cycle loop for a typical commercial microprocessor running at 4 GHz, the evaluation of a single state transition could take on the order of 4 ns. Thus, evaluating an N-byte input stream against an R-state NFA for an R-character RE would require $N*R*4$ ns. For K parallel REs, the microprocessor would sequence through each, taking $K*N*R$ 4 ns. So, for just 4 parallel Es with 8 states each, the data rate would again be limited to approximately 100 Mbps. These examples indicate that typical conventional microprocessors can deliver programmable state machine evaluation on input data rates of approximately 100 Mbps. However, in the short term, data rates of between 1 Gbps and 10 Gbps will not be uncommon in enterprise networks and environments. While it may be possible to employ multiple parallel microprocessors to execute some of the desired functions at such rates, such an approach would greatly increase system costs.

These data points indicate that the conventional microprocessor of 2003 or 2004 will be able to deliver programmable state machine evaluation on input data at rates around the 100 Mbps range. However, in this timeframe, data rates of between 1 Gbps to 10 Gbps will not be uncommon in enterprise networks and environments. Clearly, there is a severe mismatch of one to two orders of magnitude between the performance that can be delivered by the conventional microprocessor and what is demanded by the environment. While it is possible to employ multiple parallel microprocessor systems to execute some of the desired functions at the target rate, this greatly increases the cost of the system. There is clearly a need for a more efficient solution for these target functions.

BRIEF DESCRIPTION OF THE DRAWINGS

The invention may be best understood by referring to the following description and accompanying drawings that are used to illustrate embodiments of the invention. In the drawings:

FIGS. 1(a) and 1(b) illustrate the limitations of the microprocessor-based approach when implementing an FSA in accordance with the prior art;

DETAILED DESCRIPTION

Overview

Figure 2:
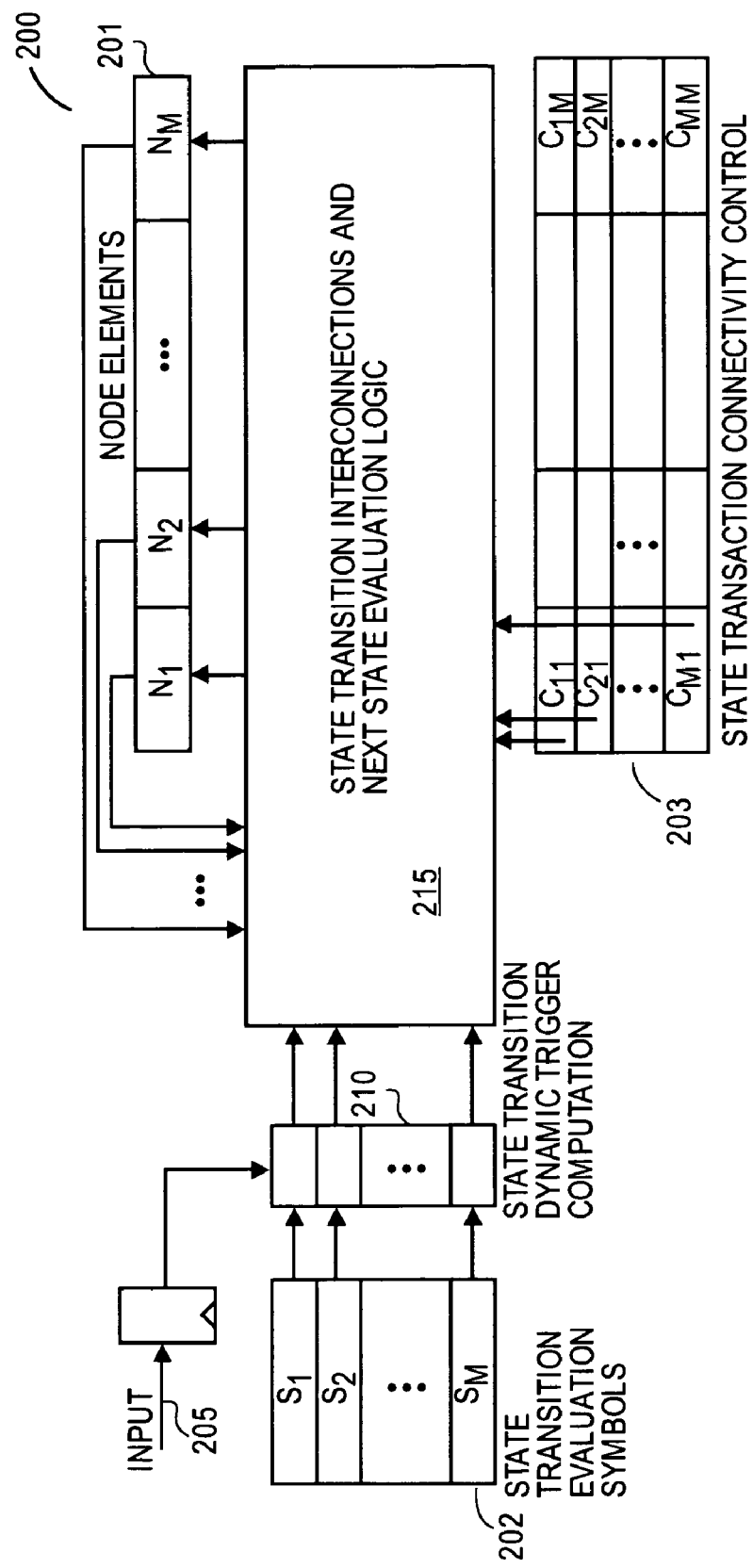
FIG. 2 illustrates a basic finite state automata building block (FSA building block) from a programming perspective in accordance with one embodiment of the invention.

Embodiments of the invention provide a state machine evaluation building block for realization of NFAs in hardware and for parallel evaluation of multiple REs on input data using these building blocks. Embodiments of the invention provide fully programmable hardware in which all of the states of an RE are instantiated and all of the states are fully connected. For one embodiment, the building blocks have a fixed number of states to facilitate efficient implementation on a chip. For such an embodiment, two or more building blocks may be connected (stitched) to accommodate REs, having a number of states greater than the fixed number of states of a building block. For one embodiment, two or more REs, having a number of states less than the fixed number of states of a building block, may be implemented within a single building block.

For one embodiment, each building block implements a variety of registers and associated control logic to efficiently solve complex REs and provide information regarding the evaluation process. For one embodiment, a large number of building blocks are implemented on a chip together with a controller and a rules memory to allow for quick reprogramming of the building blocks. Alternatively, or additionally, a context memory may be implemented on the chip to provide quickly accessible storage for context information in the event of input data interruption while contextually processing multiple distinct data streams at high speed.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Some portions of the detailed descriptions that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 2 illustrates a basic state machine evaluation building block or finite state automata building block (FSA building block) from a programming perspective in accordance with one embodiment of the invention. FSA building block 200, shown in FIG. 2, includes a number of registers that allow the FSA building block to be fully programmable.

Register 201 contains node elements that specify the current state of the FSA. Register 202 contains state transition evaluation symbols on which match a state will be transitioned. Register 203 contains a state transition connectivity control matrix that specifies which states of the FSA are connected (i.e., the enabled state connections).

Initially, the nodes are in a certain state. With each evaluation cycle, an input (e.g., an input byte) 205 is input to the state transition dynamic trigger computation 210, which compares the input to the state transition evaluation symbols contained in register 202. The comparison information is input to the state transition interconnections and next state evaluation logic 215. Then, based on the nodal connections contained in register 203, the next state is computed and latched and then becomes the current state. That is, the next states are calculated using triggers, connectivity controls, and current state bits. The architecture of the FSA building block allows a character of input data to be analyzed every clock cycle without the need for external memory.

Figure 3:
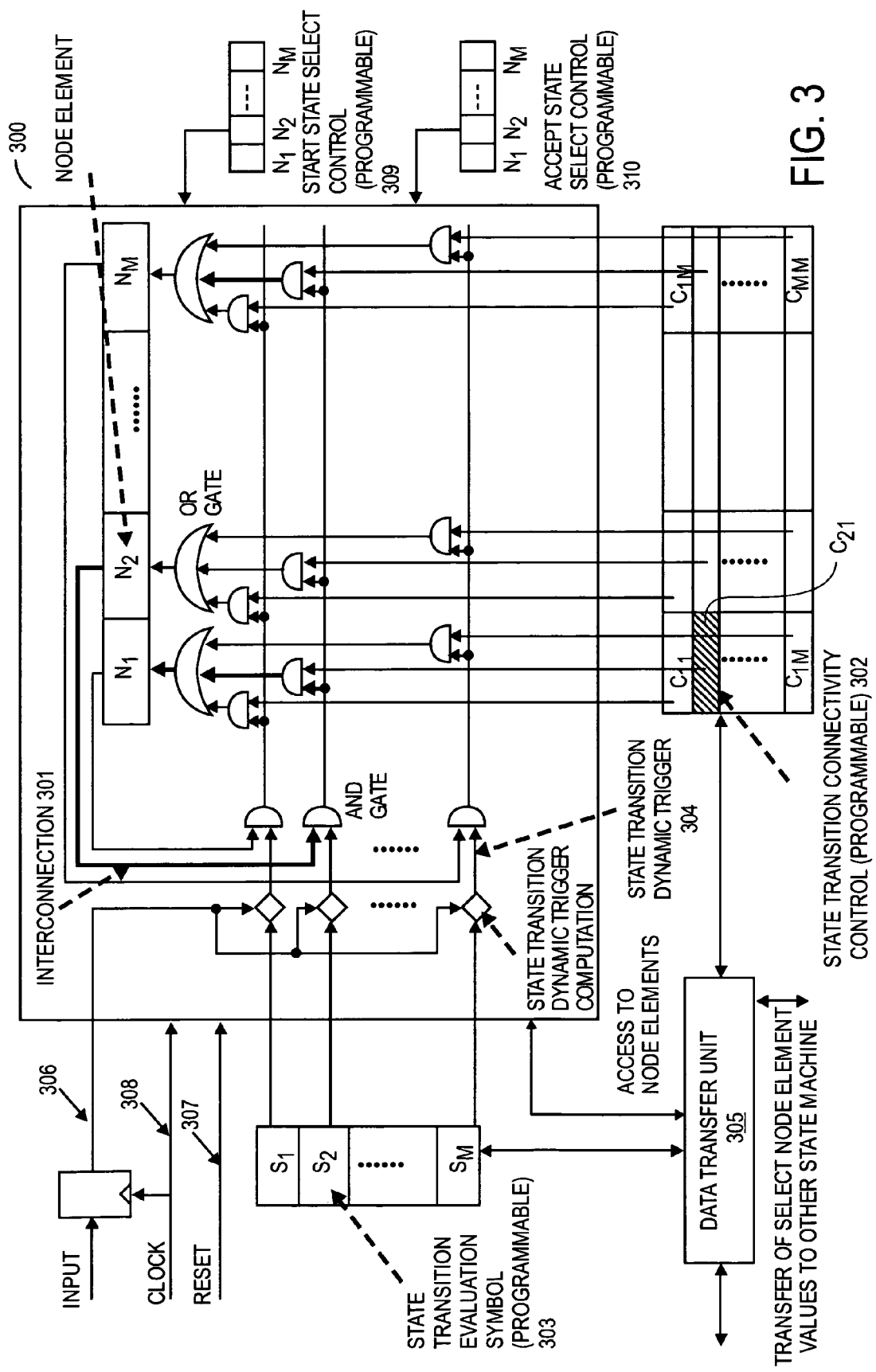
FIG. 3 illustrates a logic circuit for implementing a basic FSA building block in accordance with one embodiment of the invention.

FIG. 3 illustrates a logic circuit for implementing an FSA building block in accordance with one embodiment of the invention. The logic circuit 300, shown in FIG. 3, may be used to implement a state machine architecture for realization of a non-deterministic finite state automata with R nodes, R symbols, and R^2 arcs. In FIG. 3, R has been set to a variable M, and the hardware organization is designed and laid out to be scalable for any M. By fixing the value of M and providing the appropriate level of hardware, an FSA building block with specifically M instantiated nodes can be realized.

The node elements $N_1-N_M$ are fully connected with interconnections 301. Each node element has an arc or interconnection to itself, as well as to each of the other node elements. Hence, for M=32, there are 32×32 or 1024 interconnections 301. Likewise, for M=16, there are 16×16 or 256 interconnections 301.

For M=32, the state transition connectivity controls 302 comprise 1024 bits organized as a matrix of 32 bits×32 bits. Likewise, for M=16, the state transition connectivity controls 302 comprise 256 bits organized as a matrix of 16 bits×16 bits. A bit in row Y and column Z represents the control to enable or disable an interconnection between node element $N_Y$ and node element $N_Z$. The mechanism by which the interconnections 301 between node elements $N_1-N_M$ can be enabled or disabled by the state transition connectivity controls 302 is embodied as a switch on the interconnection (e.g., wire) 301, with the switch being gated by the relevant control bit for that interconnection. This could be implemented using AND gate logic as well.

In this embodiment, there are as many state transition evaluation symbols 303 as there are states in the machine. For M=32, there are 32 symbols. For M=16, there are 16 symbols. Each symbol could comprise a single 8-bit character value and compare operator, so that input data is specified for comparison to the 8-bit character value to compute the state transition dynamic trigger 304. In this embodiment, the logic for the state transition dynamic trigger 304 computation is as follows. A fresh byte of input data is fed simultaneously to all M comparators. A set of M match lines act as state transition dynamic triggers 304. Once again, M may be either 16 or 32.

The mechanism by which the state transition dynamic triggers 304 govern the update and transfer of values between node elements $N_1-N_M$ (over interconnections 301 that have been enabled) is implemented in this embodiment as simple AND gate logic. That is, AND gates in cooperation with OR gates act to enable and/or disable interconnections 301.

The data transfer unit 305 dynamically configures and programs the state transition connectivity controls 302 and the state transition evaluation symbols 303. This enables dynamic realization of a range of control flow graph structures or configurations. In this embodiment, for M=32, the bit matrix for the state transition connectivity controls 302 can be implemented as 32 registers of 32 bits each. Likewise, for M=16, the bit matrix for the state transition connectivity controls 302 can be implemented as 16 registers of 16 bits each. In this embodiment, for M=32, the storage for the state transition evaluation symbols 303 can be implemented as 32 registers of 8 bits each. Likewise, for M=16, the storage for the state transition evaluation symbols 303 can be implemented as 16 registers of 8 bits each.

The data transfer unit 305 also provides access to read and write the node elements $N_1$–$N_M$. For M=32, the node elements could be viewed as a logical register of 32 bits. Likewise, for M=16, the node elements could be viewed as a logical register of 16 bits. The data transfer unit 305 executes load and store operations to read and write values from and into all of these registers. This ability to read and write the node elements $N_1$–$N_M$ can be used to enable the data transfer unit 305 to communicate with an external interconnect fabric to connect the state machine building block to other such building blocks, in order to construct larger state machines or graphs. The data transfer unit 305 outputs values from selected node elements on dedicated signal wires, which can be sent to, for example, other state machines (e.g., another FSA building block) or an external interconnect fabric. Likewise, it receives values from the external interconnect fabric on dedicated signal wires. These values can be transferred into selected node elements.

A single reset signal 307 is fed to various elements of the apparatus to clear values to zero.

Before the start of the state machine evaluation, the state transition connectivity controls 302 and the state transition evaluation symbols 303 should have been programmed with desired configuration values. Hence, the signal values in the storage assigned for these controls will be stable before the state machine evaluation begins.

In one embodiment, there is a mechanism to control the start of the state machine evaluation. In one embodiment, for M=32, the start state select controls 309 consist of a register of 32 bits. In one embodiment, for M=16, the start state select controls 309 consist of a register of 16 bits. Each bit in this register corresponds to a node element. Any number of bits in this register could be set to 1 (active). Upon initialization of the state machine, node elements that correspond to active bits in the start state select controls 309 register will start as active states.

In one embodiment, the progress of the state machine evaluation is conditioned by a clock 308 that determines an evaluation cycle. In one embodiment, every evaluation cycle, a fresh byte of input data is presented to the apparatus, and this byte is evaluated in parallel against all state transition evaluation symbols (in this embodiment, this is a comparison of the input byte versus the 8-bit character value), leading to an update of set of M match lines representing the state transition dynamic triggers 304. These M triggers 304, along with the M^2 bits corresponding to the state transition connectivity controls 302, combine with the current state values in the node elements $N_{1-NM}$ to compute the next state value for each node element. The logic equation for the computation of the next state of each node element is as follows:

If the state transition dynamic triggers are $T_1$ to $T_M$
If node elements are $N_1$ to $N_M$
If state transition connectivity controls are a bit matrix $C_{I,J}$ with I=1,M, and J=1,M Then, given previous state $PS_K$ for node element $N_K$, the next state $NS_K$ is as follows:

$$NS_K = OR\ (\ [PS_1\ AND\ T_1\ AND\ C_{1,K}],\ [PS_2\ AND\ T_2\ AND\ C_{2,K}],\ \ldots\ [PS_I\ AND\ T_I\ AND\ C_{I,K}],\ \ldots\ [PS_M\ AND\ T_M\ AND\ C_{M,K}]\ )$$

Effectively, for each node element, the next state computation is a large OR function of M terms. Each term is computed by ANDing together 3 values—the previous state value of a node element, the corresponding dynamic trigger, and the corresponding connectivity control bit that indicates whether that particular interconnection 301 is enabled.

Once the next state computation is complete, the node elements are updated with the next state values, and the state machine completes a single evaluation cycle. As can be seen by the logic equations for the next state computation, the evaluation cycle time for the apparatus is three levels of logic evaluation. The first level comprises of AND gates to compute the triggers, the second level comprises of AND gates to factor in the connectivity controls, and finally an M-input OR gate. This evaluation cycle time is considerably shorter than the cycle time that governs the operating frequency of commercial microprocessors.

Note that the sequence of steps described above represents the computation needed in a single logical evaluation cycle. Physically speaking, additional pipelining is possible, to further boost the frequency of operations. For example, the computation of the state transition dynamic triggers (given a fresh byte of input data) can be decoupled from the next state evaluation.

In one embodiment, there is a mechanism to control the halting of the state machine evaluation. For M=32, the accept state select controls 310 consist of a register of 32 bits. For M=16, the accept state select controls 310 consist of a register of 16 bits. Each bit in this register corresponds to a node element. Any number of bits in this register could be set to 1 (active). Once the state machine enters into any of these states (corresponding node element goes active), the state machine halts its evaluation.

The foregoing provided a description of the evaluation cycle for a single FSA building block. When such an FSA building block is coupled to other state machines (e.g., another FSA building block) via the external interconnect fabric, an additional synchronization handshake would be incurred to enable the respective evaluation cycles to be coordinated.

The FSA building block described above can be used to realize fast and efficient implementations of non-deterministic finite state automata (NFA) in hardware. The specification of an NFA naturally maps to the apparatus. Since regular expressions (REs) are equivalent to Finite State automata, the FSA building block is especially useful for high-speed evaluation of regular expressions (REs).

Numerous algorithms exist in the prior art for mapping an RE to an NFA. [Several sources and texts exist for this material. For a detailed treatment of various algorithms, see the following reference: "Compilers: Principles, Techniques, and Tools" by Alfred V. Aho, Ravi Sethi, Jeffrey D. Ullman]. Notable algorithms include Thompson's construction and the Berry-Sethi construction. These algorithms map a regular expression comprising of a given number of characters and operators to a finite state automata. Goodness metrics for these algorithms include the significant characteristics of the constructed finite state automata. These characteristics include the number of states, number of state transition arcs, and number of state transition evaluation symbols needed to implement the state machine. It is important to point out that a certain class of construction algorithms (commonly referred to as Left-biased constructions, Right-Biased constructions, or Berry-Sethi-like constructions) lead to a mapping of an R-character regular expression to a finite state automata with R states, a maximum of $R^2$ arcs, and R symbols. Such a construction allows a further savings in hardware in the design of the apparatus for regular expression processing. Instead of building an R-node state machine with $R^2$ evaluation symbols (one symbol per arc), one only needs to provide R evaluation symbols (one per node). Thus, one only needs to provide one evaluation symbol and associated dynamic trigger computation hardware for each node. All arcs either emanating out of the node or feeding into the node are gated by this trigger. The design decision between triggering all arcs feeding into a node versus triggering all arcs emanating out from a node leads to a decision to choose between a Left-biased vs. a Right-Biased construction algorithm.

An RE can be mapped to the FSA building block described above using the Right-Biased construction algorithm. So, for example, an RE may be specified as (a|b) c, which indicates a match when character "a" or "b" is received followed by "c" (i.e., ac and bc both result in a match). Such an RE can be programmed to the FSA building block using three states. The state transition evaluation symbol 303 is programmed as follows: the first state is programmed with character "a" as the evaluation symbol (S1="a"), the second state is programmed with character "b" as the evaluation symbol (S2="b") and the third state is programmed with character "c" as the evaluation symbol (S3="c"). The state transition connectivity control 302 is programmed as follows: interconnection between node element 1 and node element 3 is enabled (C13=1), interconnection between node element 2 and node element 3 is enabled (C23=1), and all other interconnection are disabled (Cij=0 for rest). The start state select control 309 is programmed to select both state 1 and state 2 as the start states. The accept state select control 310 is programmed to select state 3 as the accept state for the hit.

The basic FSA building block, as described above, may be implemented in various ways. The remainder of the detailed description will discuss specific embodiments that address a number of concerns.

As discussed above, embodiments of the invention provide a fixed-size FSA building block (i.e., an FSA building block having a fixed number of states) to facilitate efficient implementation. In alternative embodiments, FSA building blocks of various sizes may be implemented. However, a regular, repeatable structure of a fixed size FSA building block allows for efficient implementation of a large number (e.g., 1000) of FSA building blocks on a chip.

The fixed size FSA building block, while easier to implement, raises the issue of how to address REs having a number of states greater than the fixed size of the FSA building block. For one embodiment of the invention, a fixed size for the FSA building block is determined based upon the particular problem space, and two or more FSA building blocks are connected (stitched) to accommodate REs having a greater number of states.

For one embodiment, the stitching of FSA building blocks to solve REs having an excessive number of states is accomplished as follows. The RE is converted into a syntax tree. The syntax tree is then split into a number of sub-trees, each having a number of characters that is no greater than the fixed size of the FSA building block. This division of the syntax tree may be effected using a number of well-known tree partitioning algorithms. Each sub-tree is then converted to an NFA having a number of states that can be accommodated by the fixed size FSA building blocks. The NFA for each sub-tree is then implemented on a separate FSA building block and each of the separate FSA building blocks are then stitched together to effect evaluation of the RE. An exemplary embodiment of a method for stitching FSA building blocks is described below in greater detail.

In one embodiment, interconnections required between the FSA building blocks can be implemented hierarchically for efficient realization and reduce performance penalty. At the highest performance level, a smaller number of FSA building blocks could be organized into a group and all FSA building blocks within the group are directly & fully connected to each other through dedicated wires for minimal delay. At the next level, only adjacent groups are connected to each other to reduce the wiring cost at the expense of reduced connectivity.

Depending upon the size of the REs in the problem space, a number of the FSA building blocks may be grouped together. For example, for a fixed size FSA building block of 16 states, grouping 16 FSA building blocks together could accommodate an RE having 256 states. For one embodiment of the invention, the approximately 1000 FSA building blocks on a chip are divided into groups of 16 FSA building blocks each and each FSA building block is interconnected with all FSA building blocks within its group thru dedicated wires, thereby avoiding clock penalties for stitching.

For one embodiment, each group of FSA building blocks is not interconnected with every group, rather the groups are cascaded with some groups "triggering" one or more particular other groups. For one embodiment, where such architecture is unable to accommodate an excessively large RE, a controller is employed to read the state of the FSA building block(s) and explicitly write the transition states into the stitched FSA building blocks.

As described above, an RE may be too large to be solved by a single FSA building block. By the same token, occasionally REs are smaller than the fixed size of the FSA building block. For one embodiment, two or more REs are solved using a single FSA building block as described below.

For one embodiment, the number of REs that can be solved is not limited by the number of REs instantiated within the FSA building blocks. For one embodiment, REs can be loaded to the FSA building blocks from a rule memory (e.g., conventional memory), that can store many more REs than are implemented in hardware. Coupling the FSA building blocks to a rule memory allows REs to be stored in memory and used to dynamically program the FSA building blocks.

Occasionally, the input data to a FSA building block is fragmented, that is, a first portion of the input data is followed immediately by unrelated data, which is followed subsequently by the remaining portion of the input data. To address this situation, one embodiment of the invention provides the capability of storing a partial context to a context memory and accessing the partial context at the appropriate time.

For one embodiment of the invention, the FSA building blocks include counters, pointers, and status registers to provide additional information (e.g., beyond whether or not a pattern has been discerned). For example, a counter may be used to indicate the number of times a particular RE matched or to implement more complex REs; a pointer may be used to indicate the start and end locations of an RE match; and status bits may be used to indicate various occurrences during an RE search.

System

Figure 4:
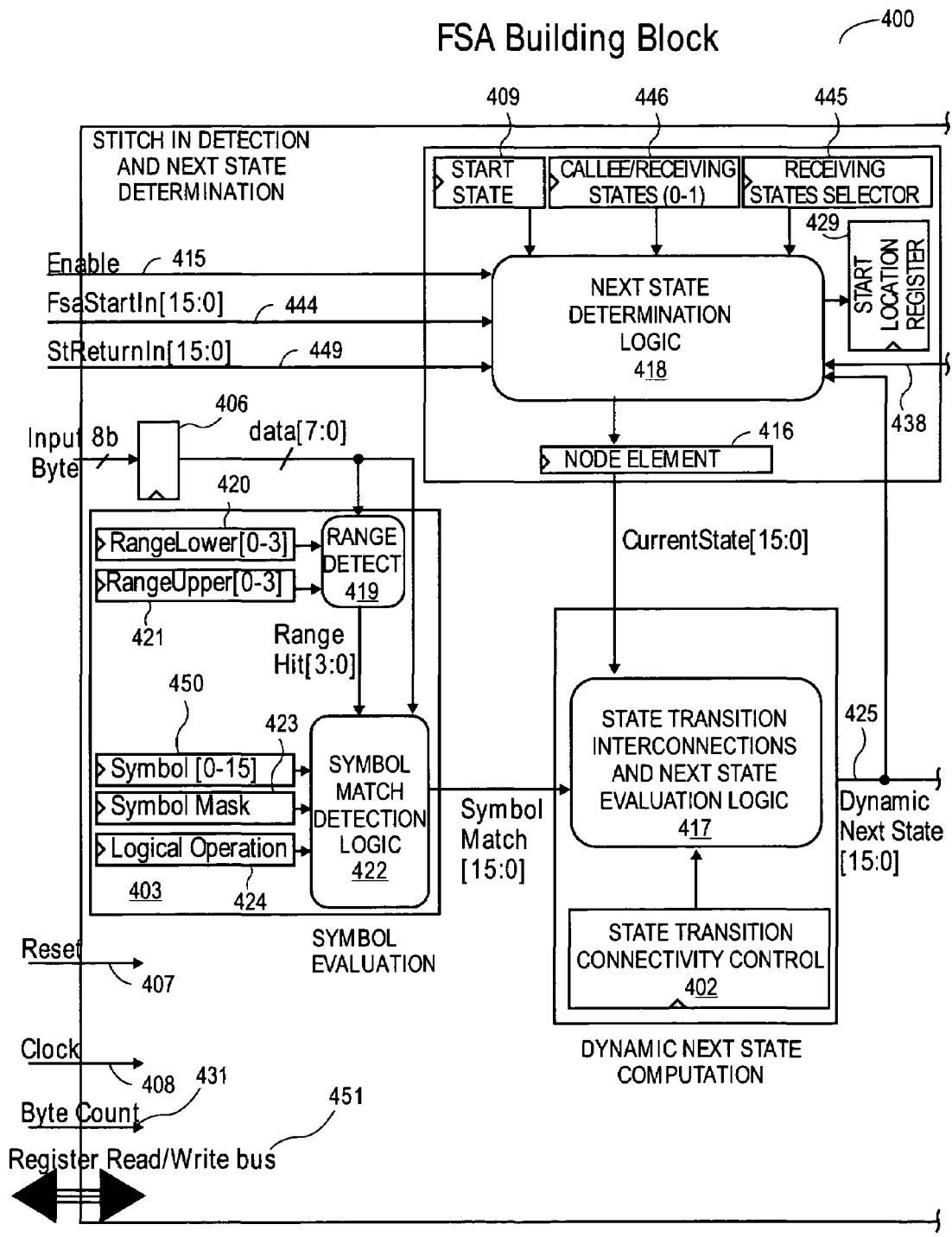
FIG. 4 illustrates an FSA building block in which a number of additional registers and logic have been implemented on top of the basic FSA building block to provide functionality required to solve complex REs in accordance with one embodiment of the invention.
Figure 4:
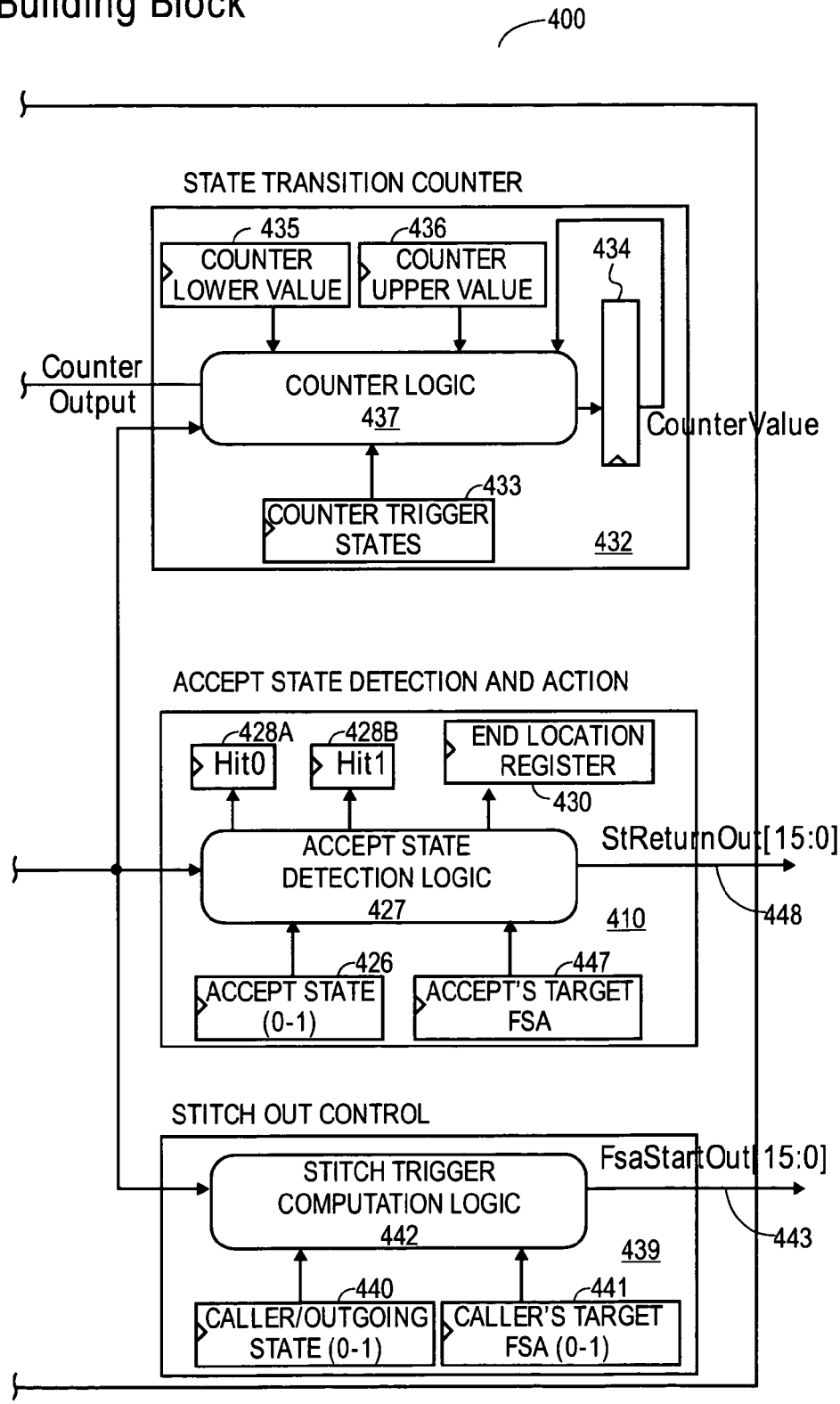

FIG. 4 illustrates an FSA building block in which a number of features have been implemented to provide additional functionality for solving complex realistic REs in accordance with one embodiment of the invention. FSA building block 400, shown in FIG. 4, is a 16-state FSA building block. FSA building block 400 includes an enable signal 415 that is driven by an externally programmed start offset/end offset register. That is, when receiving an input data stream, it is not necessary to commence evaluation at the beginning of the stream. The starting and ending points of the evaluation can be determined and programmed to drive the enable of FSA building block 400. A clock signal 408 controls the evaluation process and a reset signal 407 resets the state of the FSA building block (i.e., sets all node elements 416 and counter value 434 to zero). A start state register 409 is programmed via software to indicate which of the 16 states are initially active. When the initial clock signal 408 is received, if the enable signal 415 is high, the values contained in start state register 409 are latched into node elements 416. When an input byte 406 is received, it is compared to the evaluation symbols of the symbol evaluation unit (SEU) 403. The determination, as to whether or not the input byte is a match, is forwarded to the state transition interconnection and next state evaluation logic (STINSEL) 417. Then upon a match, and based upon the nodal connections as programmed into the state transition connectivity control (STCC) register 402, the dynamic next state (DSN) 425 is enabled and used by the next state determination logic (NSDL) 418 to determine the next state. The NSDL 418 then latches the next state to the node elements 416 at the end of the clock cycle. The latched value then becomes the current state of the FSA building block, the next input data byte is received, and the evaluation continues.

Symbol Evaluation Unit

In accordance with one embodiment of the invention, the SEU 403 contains a number of registers and accompanying logic to allow for efficient evaluation of complex REs.

An RE may be defined to employ a range rather than a single character symbol. For example, the RE may reference a character in the range of a–z or 0–9. So, for example, an RE may be specified as [a–z] b c, which indicates a match when any character in the range a–z is received followed by the occurrence of "b", followed by "c" (i.e., xbc, Xbc, etc.). Without range detection support in hardware, the range a–z has to be programmed as distinct states in the FSA building block for each character in the range (i.e., state for a, state for b, state for c, until state for z). In one embodiment of the invention, programmable range detection and match apparatus is provided as part of the FSA building block to support the range using a single FSA state. As shown in FIG. 4, the SEU 403 includes two range registers, namely rangelower register 420 and rangeupper register 421, to specify the lower range value and the upper range value, respectively, for multiple (e.g., up to four) ranges. The input byte 406 and the upper and lower range values are provided to a range detection logic 419 to determine if the input was within the specified range. This information, together with input byte 406 and the programmed match symbol from symbol register 450, is provided to the symbol match detection logic (SMDL) 422 that evaluates the input byte 406 against the symbol itself. This allows the software to program a state transition on a range, a character, or a combination thereof. This is accomplished by expanding the character definition (e.g., to include range information) and providing additional space for the character definition. For one embodiment, 16 symbol registers of 24 bits each are implemented, with 12 of the 24 bits used to define the extended character and 12 used for a bit-mask (discussed below). Of the 12 bits used for the extended character, 8 are used for the character itself, and four are used to specify whether the symbol for this state should match on one or more the ranges or not.

SEU 403 includes a symbol mask register 423 to indicate a particular bit or bits that are not to be compared. For some applications, it may be more efficient to mask a bit of the input data (i.e., to program the evaluation logic such that a particular bit is not considered). For example, in ASCII the lower case characters (a–z) and upper case characters (A–Z) differ in a single bit position (bit 5). So, for example, an RE may be specified as [a–z, A–Z] b c, which indicates a match when any character in the range a–z or any character in the range A–Z is received followed by the occurrence of "b", followed by "c" (i.e., xbc, Xbc, etc.). A–Z, without the masking support, such an RE would require four states in the FSA building block-one for range a–z, one for range A–Z, one for "b" and finally one for "c". Such an RE could be more efficiently implemented using three states in the FSA building block by using the masking apparatus by ignoring the case bit) during character comparison (i.e., masking the fifth bit). That is, by masking the case bit (fifth bit) it would not be necessary to format range a–z (lower case) and range A–Z (upper case) to separate states, a single state in the FSA building block can complete the comparison.

SEU 403 includes a logical operation register 424 that may be used to indicate state transition upon the occurrence of a matching symbol in conjunction with a logical operator. For example, an RE may be programmed such that transition occurs upon the negative polarity of the evaluation instead of the positive polarity of the evaluation (e.g., transition occurs on "NOT" match instead of match). For one such embodiment, the logical operation register provides 16 bits (i.e., one bit per state) to specify the logical operator "NOT".

Accept State Detection Unit

When the DNS 425 is enabled, the next state is checked to determine if accept state of the RE has been reached. Accept state detection unit 410 includes accept state registers 426 and accept state detection logic (ASDL) 427. The accept state registers 426 are programmed with accept states of the RE. The ASDL 427 uses the DNS 425 to determine if the programmed accept state has reached, if so, a hit is recorded in hit register 428a corresponding to the accept state register 426. This hit information can be externally made available as the result of the RE evaluation via register read/write bus 451.

In accordance with one embodiment of the invention, the ASDU 410 includes two accept state registers 426 to facilitate the packing of two REs into a single FSA building block. As described above, two or more REs having a total number of states, not greater than the fixed number of states of the FSA building block, may be packed into a single FSA building block. Each RE may have unique accept states, and therefore, accept state register and corresponding hit register should be implemented on the FSA building block for each packed RE. For the embodiment shown in FIG. 4, two accept state registers 426 are implemented along with corresponding hit registers 428a and 428b to facilitate the packing of two REs into a single FSA building block. To maintain flexibility, each register is a full 16-bit register, which allows packing REs of various sizes. For example, a 12-state RE may be packed with a 4-state RE, or in the extreme a 15-state RE could be packed with a 1-state RE. If the particular FSA building block is not being packed, the additional accept state register and corresponding hit register are not used.

Match Location Pointer

For some applications, it is useful to determine the location at which a match begins and ends. To effect such determination, a start location register 429 and an end location register 430, as well as a byte count 431, are implemented in the FSA building block in accordance with one embodiment. When the evaluation starts during evaluation, a byte count 431 is provided. When a the first transition of the next state occurs out of the start states (e.g., a RE match is initiated), the value of the byte count 431 at that point is latched to the start location register 429. When, subsequently, the DNS is enabled, a determination is made as to whether an accept state is reached (e.g., a RE match is determined), the value of the byte count at that point is latched to the end location register 430, thus providing start and end locations for the match.

State Transition Counter Unit

The FSA building block 400 includes a state transition counter unit (STCU) 432 that contains a number of registers and accompanying logic to allow for efficient evaluation of complex REs. For example, the counter allows an RE to be programmed that employs state transitions not just upon receipt of a specified symbol, but upon receipt of the specified symbol a specified number of times. So, for example, an RE may be programmed as a b {2, 4} c, which indicates a match when "a" is received followed by the occurrence of "b" from two to four times, followed by "c" (i.e., abbc, abbbc, and abbbbc). Such an RE can be programmed to the FSA building block by using state 0 for comparison of "a", state 1 for comparison of b {2,4}, and state 2 for comparison of "c". A counter trigger state (CTS) register 433 can be programmed with a trigger state (e.g., state 1, the state corresponding to "b {2,4}") for the counter 434. For this example, the CTS register 433 is programmed to state 1, the counter lower value (CLV) register 435 is programmed to 2 (i.e., the minimum number of occurrences for a match), and the counter upper value (CUV) register 436 is programmed to 4 (i.e., the maximum number of occurrences for a match). The programmed values of the CTS 433, the CLV 435, and the CUV 436, together with the value of the counter 434, are input to the counter logic 437. When the conditions of the RE are satisfied, the counter logic output 438 will be activated. The transition from one state to the nextstate 1 (corresponding to "b {2,4}") to state 2 (corresponding to "c") is controlled by the counter logic output 438, so no transition will occur until the counter logic output is high.

For one embodiment the CTS register 433 can be programmed with multiple trigger states to effect more complex REs. For example, an RE programmed as a (b|c) {2, 4} would require programming the states corresponding to "b" and "c" (i.e., states 1 and 2) as trigger states.

For one embodiment, the trigger state of CTS 433 can be programmed to an accept state of the RE to count the number of times the RE has hit.

FSA Building Block Stitching

As discussed above, embodiments of the invention provide a method for solving REs, having a number of states in excess of the number of states of the FSA building block.

For one embodiment, a number, n, of FSA building blocks of a fixed size, M, are stitched together to accommodate an RE having number of states E, where M<E≦nM.

Figure 5:
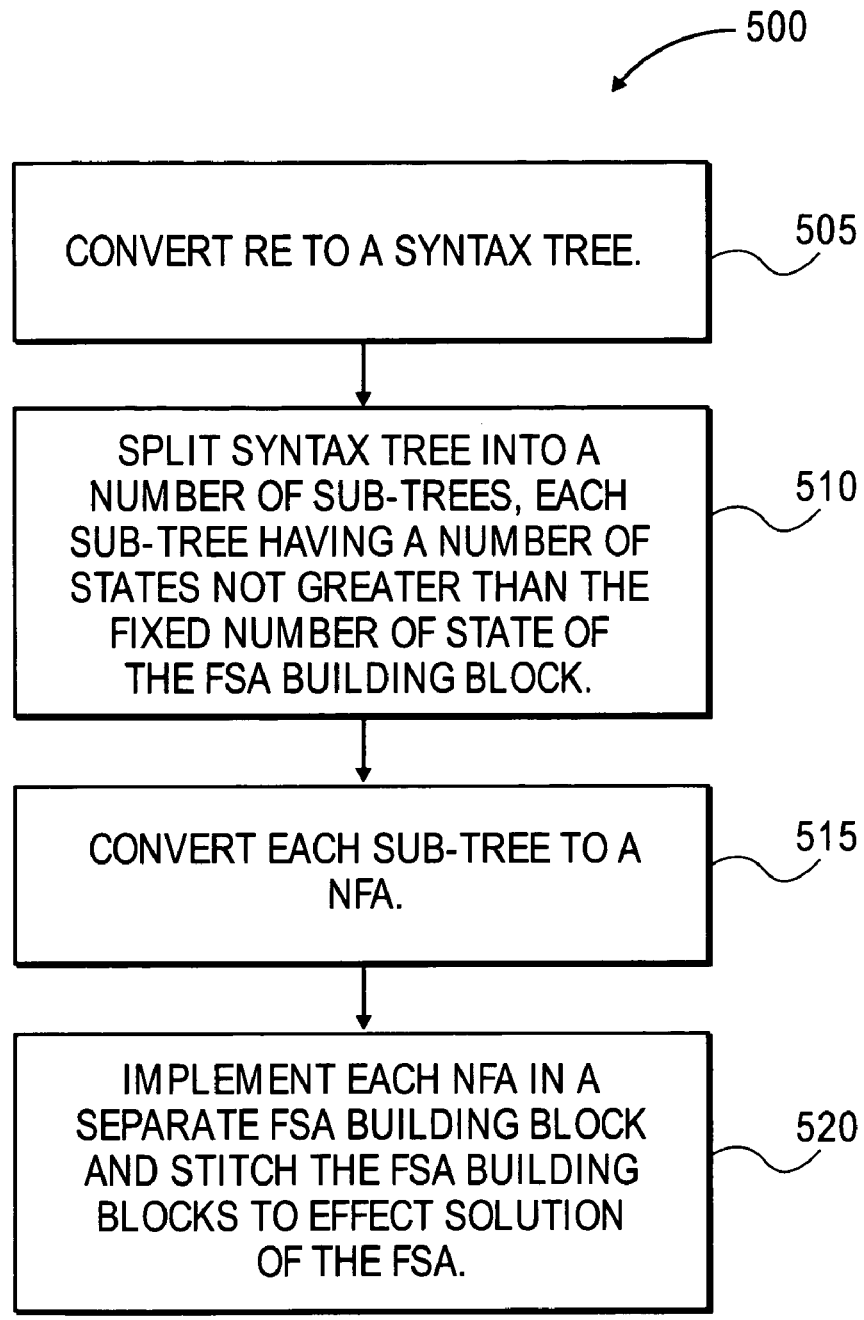
FIG. 5 illustrates a process for stitching FSA building blocks to accommodate REs having an excessive number of states.

FIG. 5 illustrates a process for stitching FSA building blocks to accommodate REs having an excessive number of states. For one embodiment, process 500, shown in FIG. 5, begins at operation 505 in which an RE is converted into a corresponding syntax tree.

At operation 510, the corresponding syntax tree is split into a parent sub-tree and one or more child sub-trees, such that all sub-trees have a number of states that are not greater than the fixed number of states of the FSA building block (i.e., ≦M). Recursive splitting of the parent and child sub-trees may be required to achieve this value. That is, the parent sub-tree may have one or more child sub-trees, and each child sub-tree may, itself, be a parent sub-tree. Each of the one or more child sub-trees is represented in the parent sub-tree by a specific character, indicating the presence of a sub-tree.

The terms parent and child used above, in reference to sub-trees, serve to indicate which sub-tree calls another sub-tree. For clarity, because each sub-tree may call another sub-tree and may itself be called, the sub-trees will be referred to as the caller or the callee.

At operation 515, each sub-tree is converted into an NFA. Each of the NFAs has a number of states that can be accommodated by a fixed-size FSA building block. Where appropriate, each NFA incorporates a specific character indicating the presence of a sub-tree to be called.

At operation 520, each NFA is implemented in a separate FSA building block and stitched together to effect solution of the RE. Upon evaluation of a caller NFA, when a stitching point (i.e., when the specific character that indicates a sub-tree) is reached, the evaluation continues as directed by the special character.

Figure 6:
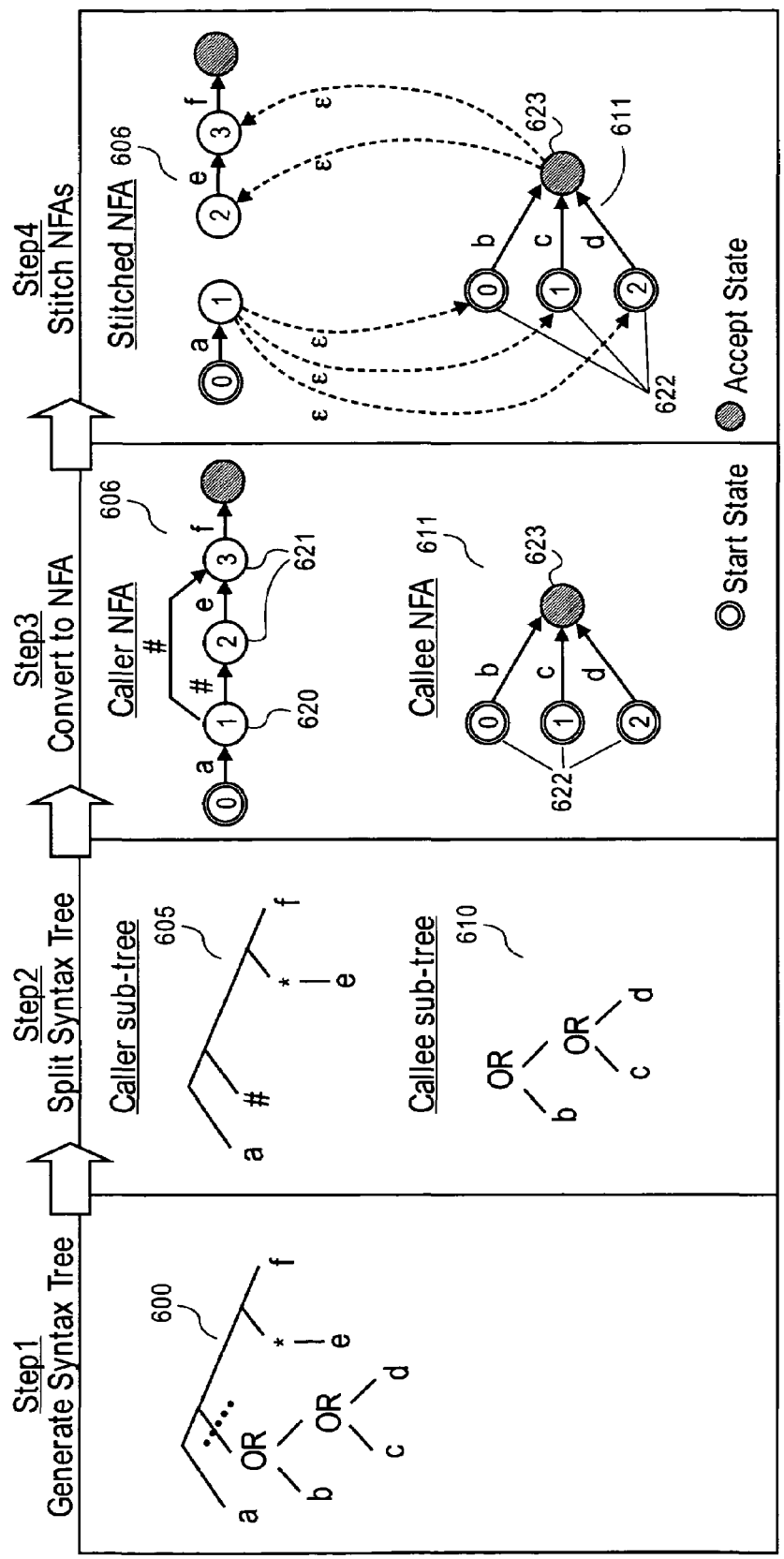
FIG. 6a-6d illustrate a graphical representation of a process for stitching FSA building blocks to accommodate REs having an excessive number of states.

FIGS. 6a–6d illustrate a graphical representation of the process of FIG. 5. As shown in FIG. 6a, the RE equal to "a(b|c|d)e*f" is represented by syntax tree 600 having six characters. Assuming a hardware limitation of an FSA building block having four states, the RE cannot be solved directly using one FSA building block.

As shown in FIG. 6b, the syntax tree 600 has been split into caller sub-tree 605 and callee sub-tree 610. Each sub-tree has no greater than four characters. Caller sub-tree 605 includes the specific character "#" to indicate the presence of a sub-tree. The hardware is programmed to proceed to the sub-tree when the specific character is encountered.

As shown in FIG. 6c, each sub-tree is converted to an NFA. Caller sub-tree 605 has been converted to caller NFA 606 and callee sub-tree 610 has been converted to callee NFA 611. The caller NFA 606 includes a switching state 620 (i.e., state 1), that has switching return states 621, (i.e., state 2 and state 3). Callee NFA 611 has start states 622 (i.e., state 0, state 1, and state 2), and an accept state 623 (i.e., state 3).

As shown in FIG. 6d, the stitching of caller NFA 606 with callee NFA 611 implements the RE. Both NFAs are evaluated concurrently every clock cycle. Upon evaluation, when stitching point 620 of caller NFA 606 is reached, the evaluation is directed to callee NFA 611 with a zero cycle transition, and start states 622 of callee NFA 611 are activated. When the accept state 623 of callee NFA 611 is reached, the evaluation is directed back to the return states 621 of caller NFA 611, again with a zero cycle transition.

The process described above, in reference to FIG. 5 and FIG. 6, can be implemented in a number of ways. The basic requirement for a hardware implementation is to connect the specific character state of the caller FSA building block to the start states of the callee FSA building block using a zero cycle transition, and connect the accept states of the callee FSA building block to the states indicated by the specific character (e.g., switching return states) using a zero cycle transition.

This means that a caller FSA building block should include a mechanism to program the stitching state and start connection to one or more callee FSA building block s, as required, and a mechanism to program switching return states to enable the next set of active states upon return of evaluation from the callee FSA building block. A callee FSA building block should include a mechanism to trigger start states of the callee FSA building block when the start connection from the caller FSA building block is active, and a mechanism to activate return connection to the caller FSA building block when the accept state of the callee FSA building block is reached.

As noted above, each FSA building block may function as a caller FSA building block or a callee FSA building block and, thus, each FSA building block should have mechanisms described for both caller FSA building block and callee FSA building block.

Referring again to FIG. 4, to effect stitching, the FSA building block 400 includes a stitch out control unit (SOCU) 439 with two caller outgoing state (COS) registers 440 and two corresponding caller's target FSA (CTF) registers 441. Each COS register is programmed with the states at which to stitch to another FSA building block. The corresponding CTF registers 441 indicate which FSA building blocks to stitch to (i.e., the callee FSA building blocks). In the stitch trigger computation logic (STCL) 442 the stitch state information and the target FSA building block information from the COS registers 440 and the corresponding CTF registers 441, respectively, and used the information are used to activate FSA startout 443. FSA startout 443 is connected to, and activates, the FSA starting 444 of the callee FSA building blocks. At the callee FSA building blocks, the set of states specified as the start state 409 are activated on receiving the FSA startin 444 signal the receiving states selector (RSS) 445 is programmed to determine which of the callee receiving state (CRS) registers 446 to access for the callee receiving states. The NSDL 418 then uses the value in the selected CRS register 446, the start state 409, and the DNS 425 to determine the next state for the callee FSA building block, which is then latched to the node elements 416. For one embodiment, the values in the selected CRS register(s) 446, the start state 409, and the DNS 425 are OR'd to determine the next state.

Similarly, when the callee FSA building block reaches an accept state contained in an accept state register 426, it determines which FSA building block to return to by reference to the accept's target FSA (ATF) register 447. The ASDL 427 uses the value in the accept state register 426 and the value in the ATF register 447 to determine when to activate stitch return out (SRO) 448. SRO 448 is connected to, and activates, the stitch return in (SRI) 449 of the target FSA building blocks, and the evaluation continues at the target FSA building blocks. At the caller FSA building block, the receiving states selector (RSS) 445 is programmed to determine which of the receiving state (RS) registers 446 to access for the caller receiving states.

The NSDL 418 in each FSA building block (both caller and callee) then uses the value in the selected RS registers 446, the start state 409, the DNS 425, and the counter output 438 to determine the next state for the FSA building block, which is then latched to the node elements 416. For one embodiment the values in the selected RS register(s) 446, the start state 409, and the DNS 425 are OR'd to determine the next state.

Figure 7:
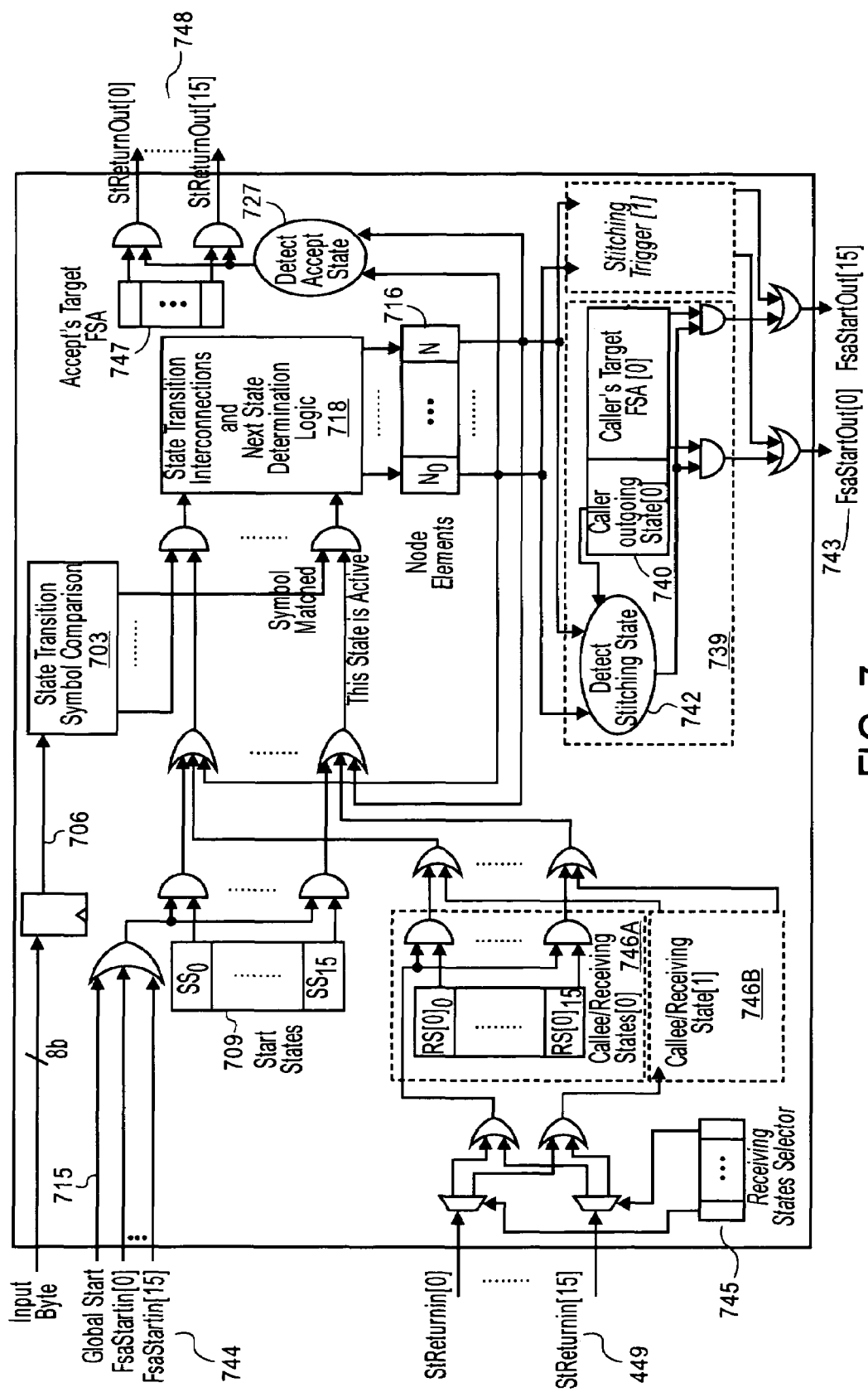
FIG. 7 illustrates a hardware architecture for providing stitching of FSA building blocks in accordance with one embodiment of the invention.

FIG. 7 illustrates a hardware architecture for providing stitching of FSA building blocks in accordance with one embodiment of the invention. The FSA architecture 700, shown in FIG. 7, includes a SOCU 739 that is used to program the stitching point and connectivity to triggered FSAs. SOCU 739 includes a COS register 740 and a CTF register 741. The COS register 740 is programmed with all of the states at which the FSA building block should stitch and the CTF register 741 is programmed with the corresponding FSA building blocks to stitch to. When the state transition interconnection and next state determination NSDL logic 718 provides a state that is a switch state (e.g., for a caller FSA building block), a switching state detector 742 will detect the switch state and enable the connection to switch to the corresponding FSA building block. That is, the FSA startout connection 743 is enabled for the appropriate callee FSA building blocks (the FSA startin connection 744 of the callee FSA building blocks is likewise enabled).

At the callee FSA building block, the receiving states selector 745 determines which CRS register 746a or 746b to access for the callee receiving states. The start states, stored in the start state register 709, the selected callee receiving states, and the dynamic next state are OR'd to determine the next state for the callee FSA building block. The evaluation continues at the callee FSA building block until an accept state of the callee FSA is reached, the accept state detector 727 detects the accept state and the ATF 747 enables the appropriate SRO 748 connection of the callee FSA building block (the returning connection (RSI) 749 of the target FSA building block is likewise enabled). The receiving states selector 745 determines which RS register 746a or 746b to access for the receiving states. At this point, the stitching return RS registers 746a and 746b of the target caller FSA building block that are programmed with switching return states to enable the next set of active states upon return are appropriately enabled (i.e., the programmed return states are enabled). At the caller FSA building block, the RS registers 746a and 746b and the dynamic next state are OR'd to determine the next state for the caller FSA building block.

With the stitching apparatus, embodiments of the invention provide the ability to evaluate an RE having an excessive number of states by implementing portions of the RE on a number of FSA building blocks and stitching the FSA building blocks together to effect evaluation of the RE.

Figure 8:
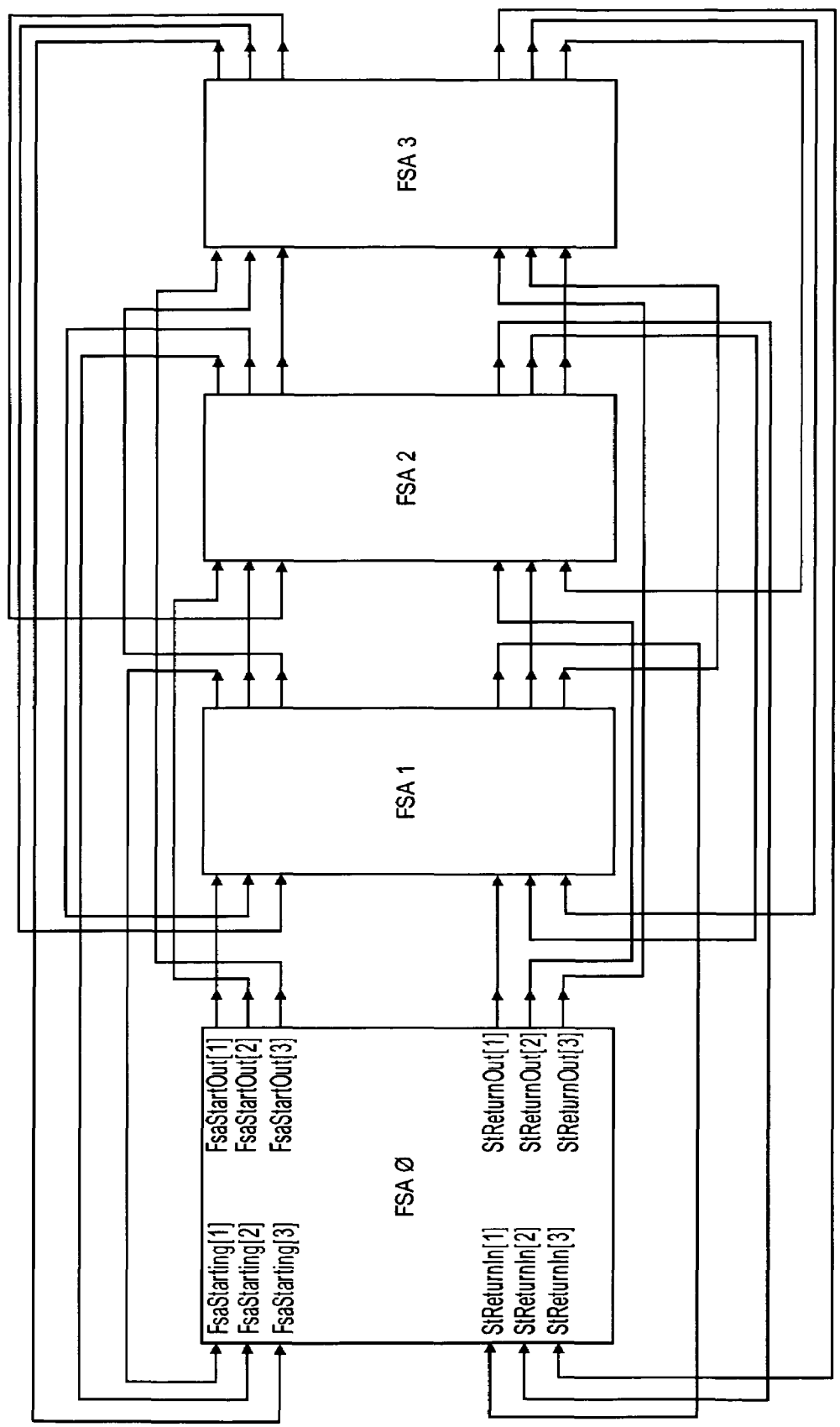
FIG. 8 illustrates the interconnection of FSA building blocks to provide FSA building block stitching in accordance with one embodiment of the invention.

FIG. 8 illustrates the interconnection of FSA building blocks to provide FSA building block stitching in accordance with one embodiment of the invention. As shown in FIG. 8, FSA building blocks 0–3 are fully interconnected with one another, as described above in reference to FIG. 7. Each FSA building block 0–3, may be connected to itself via an internal connection (not shown).

Single-Chip RE Processor

Figure 9:
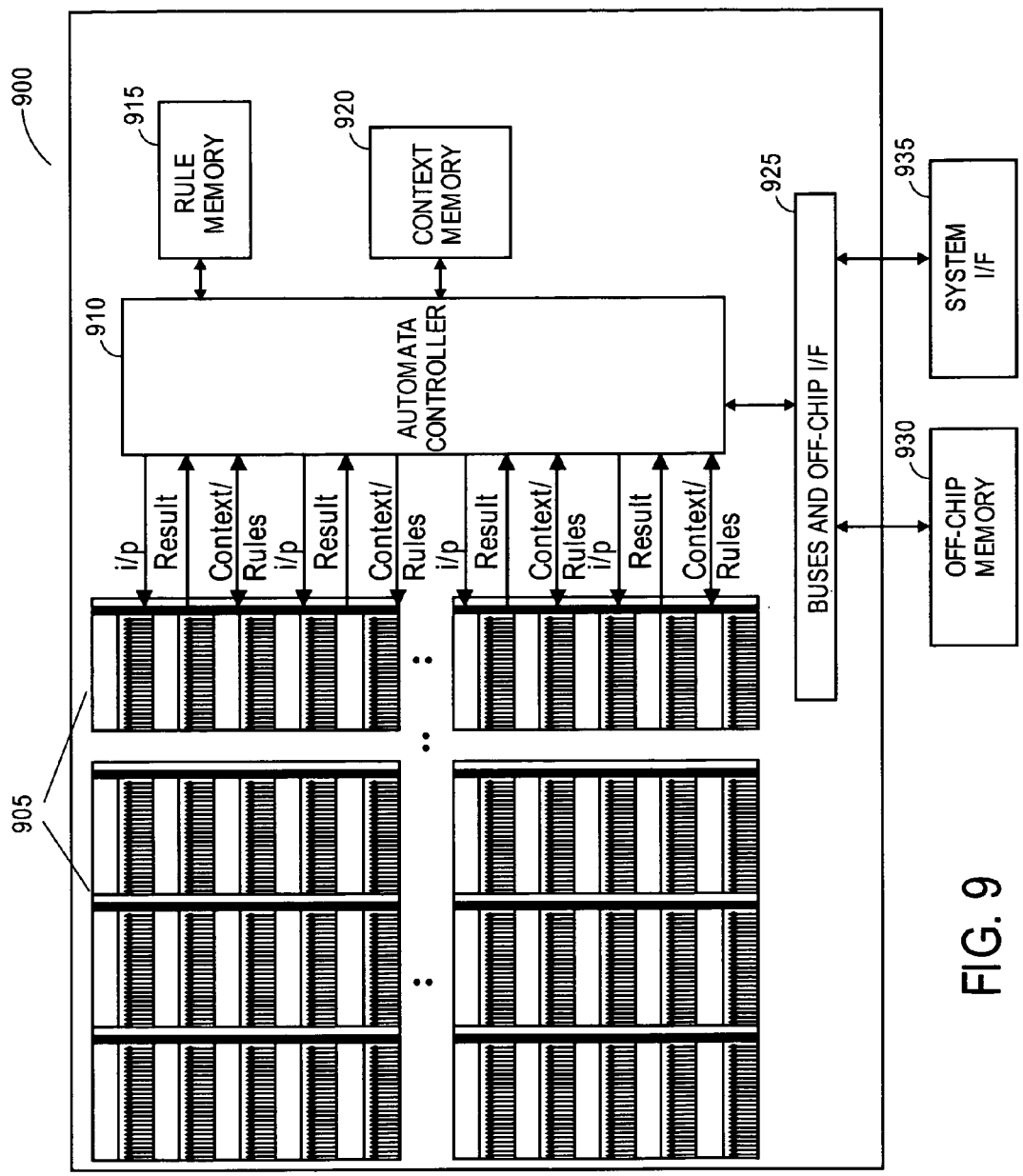
FIG. 9 illustrates a single chip RE processor, which performs high-speed contextual evaluation of REs of arbitrary sizes against multiple distinct data streams using FSA building blocks in accordance with one embodiment of the invention.

FIG. 9 illustrates an on-chip RE processor in accordance with one embodiment of the invention. RE processor 900, shown in FIG. 9, includes a number of FSA building blocks 905 that may be interconnected in groups as described above. For one embodiment, the number of FSA building blocks 905 may be approximately 1000–2000. RE processor 900 also includes an automata controller 910 that provides input data to the FSA building blocks 905. Automata controller 910 couples the FSA building blocks 905 to a rule memory 915 and a context memory 920, as well as to an on-chip external bus and other off-chip interfaces 925, for communication with off-chip memory 930 and with other system devices through an off-chip interface 935.

The automata controller 910 also enables the FSA building blocks 905 (by appropriately driving the enable 415 to FSA building blocks as shown in FIG. 4) for simultaneous evaluation of all or a subset of all of the FSA building blocks 905 on the input data stream, thereby enabling the chip to concurrently analyze the input data stream against 1000 s of REs.

For applications which do not require all the FSA building blocks 905 implemented on the chip to be programmed (for example, if the application only desires to evaluate the input data stream against a small number of REs), for one embodiment, the large number of on-chip FSA building blocks 905 could be divided into multiple partitions and the automata controller 910 provides separate input data, context memory and rule memory interconnections to each partition. This allows the multiple different input data stream to be concurrently analyzed through the different partitions for higher performance. For example, if the chip implements 1000 FSA building blocks 905 and an application require less than 500 FSA building blocks to be used, the FSA building blocks 905 could be divided into two partitions of 500 FSA building blocks each. The automata controller 910 could provide two separate input data, context memory and rule memory interconnections to each partition. The FSA building blocks in each partition are programmed with the same set of REs. Such a chip can simultaneously analyze two separate input data streams against the REs programmed in the FSA building blocks, thereby providing twice the throughput.

Context Memory

As discussed above, if the input data is fragmented, then the state (context) of the FSA building block should be saved in order to resume appropriate evaluation when the input data resumes. The context of the FSA building block includes the node element values (node element 416 in FIG. 4), the counter values (counter value 434 in FIG. 4), and potentially, the location registers (start location register 429 and end location register 430 in FIG. 4). Upon resuming the input data, the saved context from the context memory is loaded to the FSA building block so that the evaluation may continue. In accordance with one embodiment, upon interruption of the input data, the automata controller 910, which is capable of reading from and writing to the FSA building block, reads the context from the appropriate registers of the FSA building block, and stores the context, on-chip, in context memory 920. Upon resumption of the input data, the automata controller 910 loads the context from context memory 920 to the FSA building block. The amount of context data is small relative to the programmed registers of the FSA building block (for example for a 16 state FSA building block with a 16 bit counter, the maximum context size required is 2 bytes for the node element values, 2 bytes for the counter value and 4 bytes for location registers or a total of 8 bytes). Therefore, by implementing an on-chip context memory 920, it is possible to efficiently handle RE evaluations for multiple concurrent fragments of input data ed RE. In accordance with one embodiment, the automata controller 910 uses the off-chip memory 930 to store a large number of active contexts and uses the on-chip context memory 920 to cache the most frequently used contexts for higher performance. Therefore, by implementing an off-chip context memory 930 together with on-chip context memory 920, it is possible to efficiently handle RE evaluations for a large number of concurrent fragments of input data.

For applications which do not concurrently use all the FSA building blocks 905 (for example, an application may use only a smaller subset of all the FSA building blocks 905 in different phases of analysis of the input data), the automata controller 910 saves context for only the active FSA building blocks for the interrupted data stream has to be saved and restored on resumption of the data stream.

Rules Memory

Initially, the FSA building blocks 905 are programmed with rules that define the relevant REs. Without more, the FSA building blocks 905 could evaluate only those particular REs. However, applications frequently contain more REs than can be practically implemented as FSA building blocks 905. Embodiments of the invention provide FSA building blocks that are fully programmable and reprogrammable. For one embodiment, additional rules are stored in rule memory 915. Rules could be loaded by the automata controller 910 from the rule memory 915 to the FSA building blocks 905 dynamically at the start of evaluation of a new data stream, which requires these rules. The automata controller 910 moves rules from the rule memory 915 into the appropriate FSA building block and vice versa. That is, based upon an externally provided instruction or on internally detecting that a new set of rules are required, the automata controller 910 reprograms particular FSA building blocks 905 with rules stored in rule memory 915. Storing the additional rules on-chip allows for the rapid reprogramming of the FSA building blocks 905. The amount of rules that can be practically stored on-chip is at least several times the amount of rules implemented in the on-chip FSA building blocks.

For one embodiment, the automata controller can provide multiple interconnections between the rule memory 915 and the of FSA building blocks 905 and between context memory 920 and the FSA building blocks 905 in groups allows for the context and rule information to be written to or read from the FSA building blocks in parallel for high performance. Such interconnection also allows for increasing throughput by concurrently evaluating multiple data input streams. For example, if an application requires only a portion of the available FSA building blocks, then the relevant rules may be loaded repeatedly into the available FSA building blocks and the REs evaluated through multiple data input streams.

General Matters

Embodiments of the invention provide a fully programmable FSA building block, having a number of registers implemented therein, that provide the capability of evaluating complex REs of arbitrary size. For one embodiment, an RE having a number of states exceeding the fixed number of states of the FSA building block is implemented on two or more FSA building blocks and the FSA building blocks are then stitched together to effect evaluation of the RE. The FSA building block, in accordance with various embodiments of the invention, has been described in an exemplary manner. For various alternative embodiments, the FSA building block may contain some or all of the features described in such embodiments and may contain additional features for added functionality. For example, the FSA 400, described in reference to FIG. 4, contains a single clock signal, however, an alternative embodiment may contain an evaluation clock to control the values that are latched to every clock cycle (e.g., node element values, counter values, etc.) and a separate rule update clock to control updates to the configuration register. This saves power by separating the rule updates, which are less frequent.

The symbol evaluation unit 403 is an exemplary embodiment having range registers that can implement up to four ranges. In alternative embodiments, registers and logic that accommodate any suitable number of ranges may be implemented. Additionally, not only an evaluation polarity criteria may be implemented, but also any other logical operation in regard to the symbol bits and ranges during evaluation.

FSA building block 400 also includes two accept state registers and two hit registers to allow the packing of two REs into a single FSA building block, as discussed above. In an alternative embodiment, additional accept state registers and hit registers may be implemented to allow the packing of more than two REs in a single FSA building block.

FSA building block 400 provides registers to allow for detection of two stitching states and allow for stitching to two callee FSA building blocks (i.e., caller/outgoing state registers and caller target FSA registers, respectively). In alternative embodiments, additional registers may be implanted to allow the detection of more than two accept states and allow stitching to more than two callee FSA building blocks.

Likewise, the RE processor, described in reference to FIG. 9, includes separate on-chip context memory and rule memory. For one embodiment, the rule memory and the on-chip context memory could be combined into a single on-chip memory. However, because the amount of memory that can be implemented on-chip is limited, alternative embodiments may store some or all of the context and some or all of the rules to off-chip memory and system memory. For one embodiment, a combination of on-chip memory, off-chip memory, and system memory is used to store the context and rules.

Embodiments of the invention include various operations. Many of the methods are described in their most basic form, but operations can be added to or deleted from any of the methods without departing from the basic scope of the invention. While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A finite state automata building block comprising:
   a plurality of node elements that store a current state of a finite state automata evaluation;
   a plurality of programmable interconnections that fully connect the plurality of node elements;
   a symbol evaluation unit having a corresponding symbol for each of the node elements, the symbol evaluation unit evaluating an input to provide a symbol match determination;
   a state transition evaluation logic that transitions the node elements from one set of states to another set of states upon receiving a determination of a symbol match and enabled interconnection;
   a node element initialization mechanism to initialize the node elements to a specified value;
   an evaluation termination mechanisms to determine if the node elements have reached a specified evaluation termination state; and
   a stitching mechanism that activates a set of programmed state transitions of one or more target finite state automata building blocks upon detection of a specific state of the node elements.

2. The finite state automata building block of claim 1 wherein the stitching mechanism includes one or more registers to specify the specific state.

3. The finite state automata building block of claim 2 wherein the stitching mechanism includes one or more registers to identify the one or more target finite state automata building blocks.

4. The finite state automata building block of claim 1 wherein activating a set of programmed state transitions comprises:
   combining the set of programmed state transitions with a current state of a finite state automata evaluation of the target.

5. The finite state automata building block of claim 1 wherein the finite state automata building block is connected to one or more target finite state automata building blocks via a set of interconnections.

6. A finite state automata building block comprising:
   a plurality of node elements that store a current state of a finite state automata evaluation;
   a plurality of programmable interconnections that fully connect the plurality of node elements;
   a symbol evaluation unit having a corresponding symbol for each of the node elements, the symbol evaluation unit evaluating an input to provide a symbol match determination;
   a state transition evaluation logic that transitions the node elements from one set of states to another set of states upon receiving a determination of a symbol match and enabled interconnection;
   a node element initialization mechanism to initialize the node elements to a specified value; and
   two or more evaluation termination mechanisms each of which determines if a corresponding set of the node elements has reached a corresponding specified evaluation termination state.

7. The finite state automata building block of claim 6 wherein each of the two or more evaluation termination mechanisms includes a register containing the corresponding specified evaluation termination state.

8. The finite state automata building block of claim 6 wherein each of the two or more evaluation termination mechanisms includes a register to indicate that the corresponding specified evaluation termination state has been reached.

9. A finite state automata building block comprising:
   a plurality of node elements that store a current state of a finite state automata evaluation;

a plurality of programmable interconnections that fully connect the plurality of node elements;

a symbol evaluation unit having a corresponding symbol for each of the node elements, the symbol evaluation unit evaluating an input to provide a symbol match determination;

a state transition evaluation logic that transitions the node elements from one set of states to another set of states upon receiving a determination of a symbol match, enabled interconnection, and a counter that counts the occurrence of a specified set of states having reached a specified counter value;

a node element initialization mechanism to initialize the node elements to a specified value; and an evaluation termination mechanisms to determine if the node elements have reached a specified evaluation termination state.

10. The finite state automata building block of claim 9 wherein the occurrence of the specified set of states is a part of a regular expression definition.

11. The finite state automata building block of claim 10 wherein the specified set of states is contained in a state specification register.

12. The finite state automata building block of claim 10 wherein the specified counter value is contained in a counter value register.

* * * * *

UNITED STATES PATENT AND TRADEMARK OFFICE
CERTIFICATE OF CORRECTION

PATENT NO. : 7,085,918 B2
APPLICATION NO. : 10/755048
DATED : August 1, 2006
INVENTOR(S) : Harshvardhan Sharangpani et al.

It is certified that error appears in the above-identified patent and that said Letters Patent is hereby corrected as shown below:

On the Title Page Item (75): delete "Harshvardan Sharangpani" and insert --Harshvardhan Sharangpani--.

On the Title Page Item (73): delete "Cisco Systems, Inc." and insert --Cisco Technology, Inc.--.

In column 7, line 67: delete "elements $N_1\text{-}_{NM}$" and insert --elements $N_1\text{-}N_M$--.

In column 13, line 30: delete "When a the first" and insert --When the first--.

In column 15, line 25: delete "FSA building block s" and insert --FSA building blocks--.

In column 15, line 51: delete "respectively, and used the information are used to activate FSA" and insert --respectively, are used to activate FSA--.

In column 15, line 53: delete "the FSA starting" and insert --the FSA startin--.

In column 17, line 36: delete "an application require less" and insert --an application requires less--.

In column 18, line 48: delete "and the of FSA" and insert --and the FSA--.

In column 18, line 50: delete "allows for" and insert --allowing for--.

Signed and Sealed this

Thirteenth Day of November, 2007

JON W. DUDAS
*Director of the United States Patent and Trademark Office*